(12) United States Patent
Kim et al.

(10) Patent No.: US 8,849,025 B2
(45) Date of Patent: Sep. 30, 2014

(54) COLOR CONVERSION APPARATUS AND METHOD THEREOF

(75) Inventors: Kyeong-man Kim, Yongin-si (KR); Hyun-cheol Kim, Seongnam-si (KR); In-ho Park, Suwon-si (KR); Jae-min Shin, Seoul (KR); Heui-keun Cho, Seongnam-si (KR); Yeong-ho Ha, Daegu (KR); Dae-chul Kim, Daegu (KR); Wang-jun Kyung, Gumi-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 230 days.

(21) Appl. No.: 13/297,703

(22) Filed: Nov. 16, 2011

(65) Prior Publication Data

US 2012/0257826 A1 Oct. 11, 2012

(30) Foreign Application Priority Data

Apr. 9, 2011 (KR) .................. 10-2011-0032981

(51) Int. Cl.
- *G06K 9/00* (2006.01)
- *G06T 11/00* (2006.01)
- *H04N 9/64* (2006.01)
- *H04N 1/62* (2006.01)

(52) U.S. Cl.
CPC .............. *G06T 11/001* (2013.01); *H04N 9/643* (2013.01); *H04N 1/62* (2013.01); *H04N 1/628* (2013.01)
USPC ........................................ 382/167

(58) Field of Classification Search
None
See application file for complete search history.

(56) References Cited

U.S. PATENT DOCUMENTS

| | | | | |
|---|---|---|---|---|
| 4,631,578 A | * | 12/1986 | Sasaki et al. | 358/518 |
| 5,130,935 A | | 7/1992 | Takiguchi | |
| 5,270,808 A | * | 12/1993 | Tanioka | 358/527 |
| 5,684,359 A | * | 11/1997 | Yano et al. | 313/487 |
| 5,947,029 A | * | 9/1999 | Loeffler et al. | 101/484 |

(Continued)

FOREIGN PATENT DOCUMENTS

| | | |
|---|---|---|
| EP | 1447973 | 8/2004 |
| JP | 2007-094840 | 4/2007 |
| KR | 10-2006-0114856 | 11/2006 |
| KR | 10-2010-0056280 | 5/2010 |

OTHER PUBLICATIONS

European Extended Search Report Issued on Jun. 4, 2012 in EP Patent Application No. 11189134.7.

(Continued)

*Primary Examiner* — Bhavesh Mehta
*Assistant Examiner* — Feng Niu
(74) *Attorney, Agent, or Firm* — Stanzione & Kim, LLP

(57) ABSTRACT

A color conversion method includes determining a race by recognizing a skin region in an input image, selecting a preferred skin color to apply to the skin region based on a plurality of preferred skin color information preset per race, and correcting a color of the skin region using the selected preferred skin color. Additionally, a color conversation apparatus includes a control unit to determine a race by recognizing a skin region in an input image input, and to select a preferred skin color to apply to the skin region, based on the plurality of the preferred skin color information stored in a storage unit, and a compensation unit to correct a color of the skin region using the preferred skin color selected by the control unit. Hence, the skin color per race can be adequately converted to the color which can satisfy the user.

22 Claims, 11 Drawing Sheets

(56) References Cited

U.S. PATENT DOCUMENTS

| | | | |
|---|---|---|---|
| 6,823,083 B1* | 11/2004 | Watanabe et al. | 382/167 |
| 2004/0208114 A1* | 10/2004 | Lao et al. | 369/125 |
| 2004/0228528 A1* | 11/2004 | Lao | 382/167 |
| 2006/0158704 A1 | 7/2006 | Kameyama | |
| 2006/0250411 A1 | 11/2006 | Oh | |
| 2007/0071316 A1* | 3/2007 | Kubo | 382/162 |
| 2008/0112622 A1* | 5/2008 | Kwak et al. | 382/190 |
| 2008/0181468 A1* | 7/2008 | Oosaki | 382/118 |
| 2009/0322775 A1* | 12/2009 | Fukuda | 345/581 |
| 2010/0123801 A1 | 5/2010 | Son et al. | |

OTHER PUBLICATIONS

Do-Hun Kim et al: "Preferred skin color reproduction based on adaptive affine transform", 2005 Digest of Technical Papers. International Conference on Consumer Electronics (IEEE CAT. No. 05CH37619) IEEE Piscataway, NJ, USA, Jan. 8, 2005, pp. 185-186, XP010796593, DOI: 10.1109/ICCE.2005.1429779, ISBN: 978-0-7803-8838-3.

Eung-Joo Lee et al: "Automatic Flesh Tone 1-14 Reappearance for Color Enhancement in TV", vol. 43, No. 4, Nov. 1, 1997, pp. 1153-1559, XP011008509.

Huanzhao Zeng et al: "Preferred skin color enhancement for photographic color reproduction", Proceedings of SPIE, vol. 7866, Jan. 1, 2011, pp. 786613-786613-9, XP55027156, ISSN: 0277-786X, DOI: 10.1117/12.874359.

Demas Sanger et al: "Facial Pattern Detection and Its Preferred Color Reproduction", Second Color Imaging Conference: Color Science, Systems, and Applications. Nov. 1, 1994, pp. 149-153, XP009159304.

Du-Sik Park et al: "Preferred skin color reproduction on the display", Journal of Electronics Imaging, vol. 15, No. 4, Jan. 1, 2006, p. 041203, XP55027110, ISSN: 1017-9909, DOI: 10.1117/1.2400850.

* cited by examiner

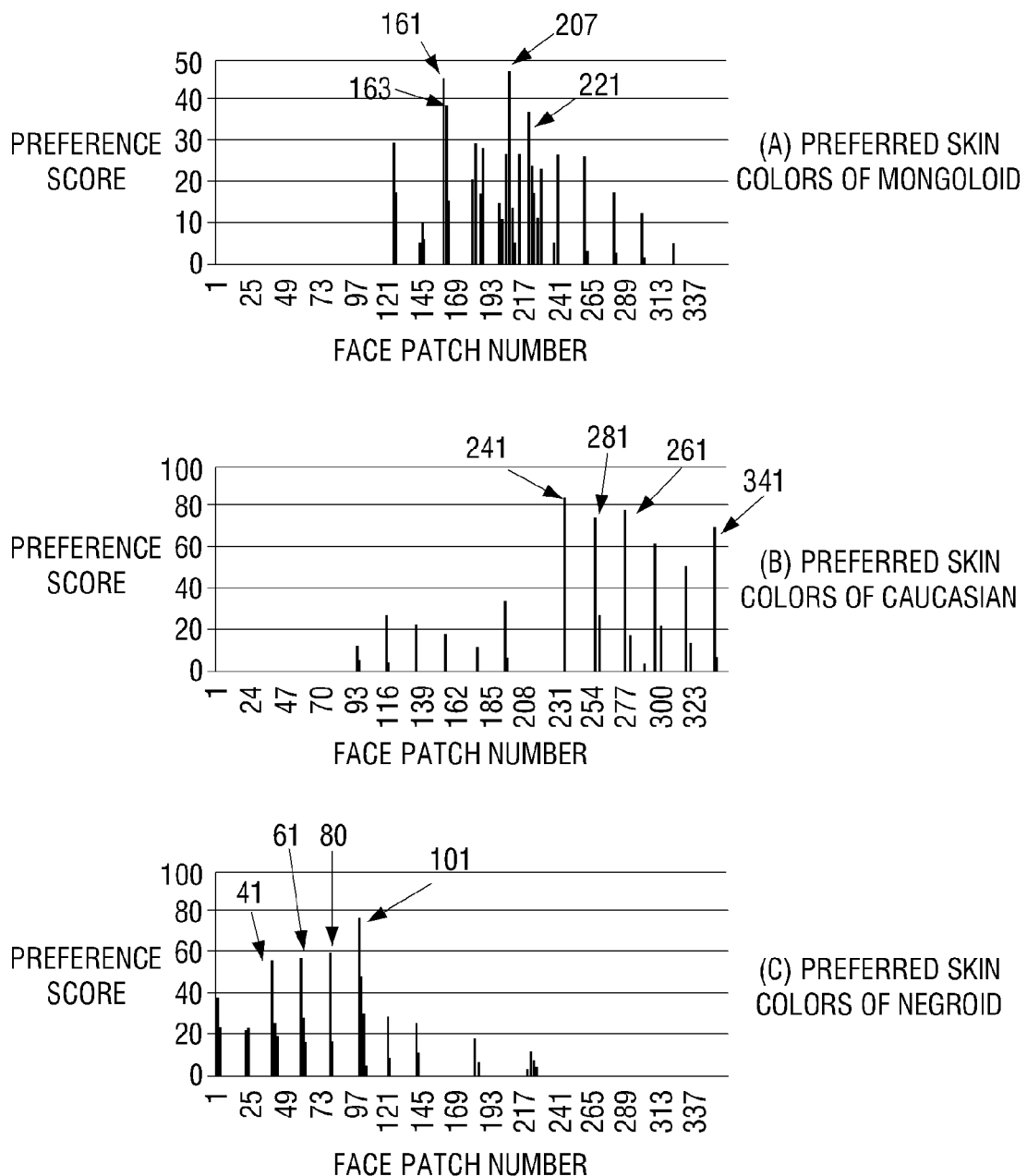

COLOR CONVERSION APPARATUS AND METHOD THEREOF

CROSS-REFERENCE TO RELATED APPLICATIONS

This application claims priority under 35 U.S.C. §119(a) from Korean Patent Application No. 10-2011-0032981 filed on Apr. 9, 2011 in the Korean Intellectual Property Office, the entire disclosure of which is incorporated herein by reference.

BACKGROUND OF THE GENERAL INVENTIVE CONCEPT

1. Field of the General Inventive Concept

The present general inventive concept generally relates to a color conversion apparatus and method. More particularly, the present general inventive concept relates to color conversion apparatus and method to correct an input image with a preferred skin color per race 2. Description of the Related Art Thanks to the advance of electronic technology, various display devices or image forming devices, such as digital cameras, scanners, printers, multi-function devices, copiers, mobile phones, and TVs, for displaying images on a screen or on diverse recording media are developed and supplied.

Those devices are selling all over the world and used by various races having different skin tones, i.e., skin colors. However, a preferred color for the skin color of a different race or the same race can differ per race.

That is, it is general for people to have the fixed idea for the color in their mind. For example, the ocean is blue, the dark is black, and the grass is green. As such, reproduction of the color of the object based on the experience in the head is typically referred to as a memory color. Reproduction of a similar color of the memory color of an observer by defining the memory color in chromaticity coordinates is the preferred color reproduction.

However, the current devices output colors of the input image as they are. Accordingly, as the memory color of a user is different from the output color of the image, the user can confuse whether his/her observed image is accurate.

This confusion can aggravate when the plurality of the races appears together in one image.

Hence, a technique for providing the image of the color easily perceived by the user is demanded.

SUMMARY

The present general inventive concept provides a color conversion apparatus and method to enhance visual satisfaction by converting color using preferred skin color information per race.

Additional features and utilities of the present general inventive concept will be set forth in part in the description which follows and, in part, will be obvious from the description, or may be learned by practice of the general inventive concept.

The foregoing and/or other features of the present general inventive concept may be achieved by providing a color conversion method including determining a race by recognizing a skin region in an input image, selecting a preferred skin color to apply to the skin region, based on a plurality of preferred skin color information preset per race, and correcting a color of the skin region using the selected preferred skin color.

The determining of the race may include dividing the input image into a plurality of blocks and detecting a block corresponding to the skin region among the plurality of the blocks, and determining the race of the skin region in the block using pixel characteristic information of the detected block and the plurality of the preferred skin color information.

The pixel characteristic information may be an average chromaticity based on an average brightness per block. The determining of the race may include calculating Euclidean distances between the average chromaticity and a chromaticity of the plurality of the preferred skin color information, and confirming the preferred skin color information of a minimum Euclidean distance to the average chromaticity among the plurality of the preferred skin color information, and determining that the skin region is the race corresponding to the confirmed preferred skin color information.

The selecting of the preferred skin color, when the determined race is a dark-skin toned raced, may select the preferred skin color of the minimum Euclidean distance by comparing Euclidean distances between four preferred skin colors preset corresponding to the dark-skin toned race and the average chromaticity, and when the determined race is not the dark-skin toned race, select the preferred skin color of the minimum Euclidean distance by comparing Euclidean distances between four preferred skin colors preset corresponding to medium-skin toned race and four preferred skin colors preset corresponding to light-skin toned race, and the average chromaticity.

The correcting may include calculating a nonlinear weight according to a difference between the selected preferred skin color and the skin color of the skin region, multiplying the difference between the preferred skin color and the skin color of the skin region by the weight and calculating an output color corrected by adding the product to the skin color of the skin region, and outputting in the calculated output color.

The calculating of the output color may calculate the output colors for Cb and Cr based on the following equation:

$$Cb_{output} = Cb_{input} + R1(Cb_{preferred} - Cb_{input})$$

$$Cr_{output} = Cr_{input} + R2(Cr_{preferred} - Cr_{input})$$

$$R1 = |(Cb_{preferred} - Cb_{input})/d_{Cb\ max}|^2$$

$$R2 = |(Cr_{preferred} - Cr_{input})/d_{Cr\ max}|^2$$

where $Cb_{output}$ and $Cr_{output}$ denote the output color corrected for Cb and Cr, $Cb_{preferred}$ and $Cr_{preferred}$ denote the preferred skin color selected for Cb and Cr, R1 and R2 denote the weight for Cb and Cr, $d_{Cb\ max}$ and $d_{Cr\ max}$ denote maximum difference and minimum difference of Cb and Cr respectively, and $Cb_{input}$ and $Cr_{input}$ denote values Cb and Cr of the skin region respectively.

A color conversion apparatus may include a storage unit to store a plurality of preferred skin color information preset per race, an input unit to receive an image, a control unit to determine a race by recognizing a skin region in the input image input via the input unit, and to select a preferred skin color to apply to the skin region, based on the plurality of the preferred skin color information stored to the storage unit, and a compensation unit to correct and/or adjust a color of the skin region using the preferred skin color selected by the control unit.

The input image may include, but is not limited to, a still-image and a moving image. The still image may be captured using a photographing camera, for example. The moving image may be captured using a video recording apparatus, such as a video camera for example.

The control unit may divide the input image into a plurality of blocks, detect a block corresponding to the skin region among the plurality of the blocks, and determine the race of the skin region in the block using pixel characteristic information of the detected block and the plurality of the preferred skin color information. The control unit may be included in a variety of apparatuses including, but not limited to, a still-image photographic camera, an image scanning device. Additionally, the control unit may be included in a video reproduction and/or display device, such as a television. The control unit incorporated in a television, for example, may dynamically determine a plurality of skin regions of a moving image, determine the race of the moving image, and correct and/or adjust a color of the skin regions based on the determined race, as discusses further below. Further, the control unit of the television may determine a background scene including one or more skin portions of the moving image, and may correct and/or adjust a color of the one or more skin regions based on the determined race and the background scene. Accordingly, one or more moving images may be better distinguished from the background scene. Moreover, as the background scene including one or moving image changes, skin regions of moving images may be dynamically adjusted and displayed ideally to a viewer.

The pixel characteristic information may be an average chromaticity based on an average brightness per block. The control unit may calculate Euclidean distances between the average chromaticity and a chromaticity of the plurality of the preferred skin color information, confirm the preferred skin color information of a minimum Euclidean distance to the average chromaticity among the plurality of the preferred skin color information, and determine that the skin region is the race corresponding to the confirmed preferred skin color information.

When the determined race is dark-skin toned race, the control unit may select the preferred skin color of the minimum Euclidean distance by comparing Euclidean distances between four preferred skin colors preset corresponding to the dark-skin toned race and the average chromaticity, and when the determined race is not the dark-skin toned race, the control unit may select the preferred skin color of the minimum Euclidean distance by comparing Euclidean distances between four preferred skin colors preset corresponding to medium-skin toned race and four preferred skin colors preset corresponding to light-skin toned race, and the average chromaticity.

The compensation unit may calculate a nonlinear weight according to a difference between the selected preferred skin color and the skin color of the skin region, multiply the difference between the preferred skin color and the skin color of the skin region by the weight, calculate an output color corrected by adding the product to the skin color of the skin region, and output the input image in the calculated output color.

The compensation unit may calculate the output colors for Cb and Cr based on the following equation:

$$Cb_{output} = Cb_{input} + R1(Cb_{preferred} - Cb_{input})$$

$$Cr_{output} = Cr_{input} + R2(Cr_{preferred} - Cr_{input})$$

$$R1 = |(Cb_{preferred} - Cb_{input})/d_{Cb\ max}|^2$$

$$R2 = |(Cr_{preferred} - Cr_{input})/d_{Cr\ max}|^2$$

where $Cb_{output}$ and $Cr_{output}$ denote the output color corrected for Cb and Cr, $Cb_{preferred}$ and $Cr_{preferred}$ denote the preferred skin color selected for Cb and Cr, R1 and R2 denote the weight for Cb and Cr, $d_{Cb\ max}$ and $d_{Cr\ max}$ denote maximum difference and minimum difference of Cb and Cr respectively, and $Cb_{input}$ and $Cr_{input}$ denote values Cb and Cr of the skin region respectively.

A color conversion method includes detecting a skin region from an input image, selecting a preferred skin color corresponding to the detected skin region, among a plurality of preferred skin color information preset, and correcting a color of the skin region using the selected preferred skin color. The plurality of the preferred skin color information may include a plurality of preferred skin color information obtained per race through repetitive experiments.

A color conversion apparatus includes a storage unit to store a plurality of preferred skin color information obtained per race through repetitive experiments, an input unit to receive an image, a control unit to detect a skin region in an input image input via the input unit, and to select preferred skin color information corresponding to the detected skin region among the preferred skin color information stored to the storage unit, and a compensation unit to correct a color of the skin region using the preferred skin color selected by the control unit.

As set forth above, as the preferred skin color per race can be reproduced, the user satisfaction can be enhanced.

BRIEF DESCRIPTION OF THE DRAWINGS

These and/or other features and utilities of the present general inventive concept will become apparent and more readily appreciated from the following description of the exemplary embodiments, taken in conjunction with the accompanying drawings of which:

FIG. 3 is a diagram of preferred skin color selection experiment results per race;

DETAILED DESCRIPTION OF THE EXEMPLARY EMBODIMENTS

Figure 1:
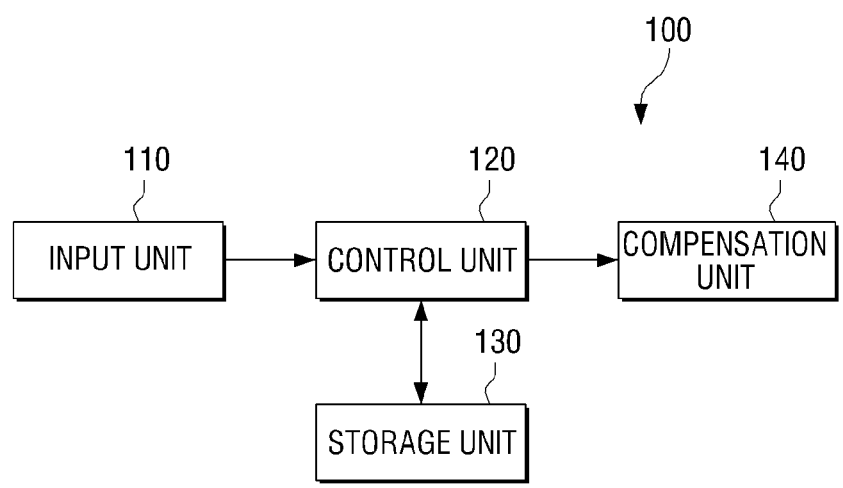
FIG. 1 is a block diagram of a color conversion apparatus according to an exemplary embodiment of the present general inventive concept.

Reference will now be made in detail to the exemplary embodiments of the present general inventive concept, examples of which are illustrated in the accompanying drawings, wherein like reference numerals refer to the like elements throughout. The exemplary embodiments are described below in order to explain the present general inventive concept while referring to the figures.

FIG. 1 is a block diagram of a color conversion apparatus 100 according to an exemplary embodiment of the present general inventive concept. Referring to FIG. 1, the color conversion apparatus 100 includes an input unit 110, a control unit 120, a storage unit 130, and a compensation unit 140. The color conversion apparatus 100 can be implemented using various devices such as digital camera, printer, copier, multi-function device, scanner, fax machine, portable phone, and display device.

The input unit 110 receives an image. The input unit 110 can be implemented variously in exemplary embodiments of the present general inventive concept. In detail, the input unit 110 may directly receive an image captured by an external imaging device, or receive an image from an external host device. Alternatively, when the image conversion apparatus is implemented using an imaging device such as a digital camera, the input unit 110 may receive an image from an imaging unit of the image conversion apparatus. Alternatively, the input unit 110 may read an image pre-stored to the storage unit 130.

The storage unit 130 can store a plurality of preferred skin color information preset corresponding to each race. That is, when at least one preferred skin color is derived from a user experiment conducted on Dark-skin toned race, Light-skin toned race, or Medium-skin toned race, information such as chromaticity or brightness of the preferred skin color can be stored to the storage unit 130. Dark-skin toned race may include, but is not limited to, African, African-American, Caribbean and Afro-Caribbean. Medium-skin toned race may include, but is not limited to, Latino, South American, Mexican, Asian and various European races. Light-skin toned race may include, but is not limited to, Caucasian, Icelandic and various European races.

Herein, the experiment can distinguish the preferred color per race with respect to the skin colors of the Dark-skin toned race, Medium-skin toned race, and Light-skin toned race. That is, to the Dark-skin toned race user, the experiment shows a number of Dark-skin toned race images with only the chromaticity changed to select the most preferred Dark-skin toned race image, shows a number of Medium-skin toned race images with only the chromaticity changed to select the most preferred Medium-skin toned race image, and shows a number of Light-skin toned race images with only the chromaticity changed to select the most preferred Light-skin toned race image. By computing the experiment results corresponding to the plurality of the Dark-skin toned race users together, the preferred skin colors of the Dark-skin toned race users with respect to each race can be obtained. This experiment can be conducted also to the users of the other races. As such, the experiment is conducted on the users per race to select the preferred skin color of the different races and the same race, a plurality of the preferred skin colors is determined according to the experiment results, and thus the preferred skin colors can be stored to the storage unit 130.

That is, it is necessary to determine the preferred color of the people in order to reproduce the preferred color. In general, the preferred color of the people varies according to their living environment and culture. Naturally, the preferred skin color also varies per race. Hence, by determining the preferred color per race of the single race through the experiment, the preferred color per race can be determined by the races.

The experiment to select the preferred skin color can be conducted in various manners.

For example, for the Medium-skin toned race, the preferred color per brightness can be determined for the Medium-skin toned race, the Dark-skin toned race, and the Light-skin toned race. The Medium-skin toned race which is the experiment subjects may be selected to a certain number of people by considering the age or the sex, or randomly selected. Accordingly, the experiment can be conducted on the plurality of the selected Medium-skin toned race observers to subjectively select the preferred color by showing the plurality of the same images with the different chromaticity. Based on the experiment results, a certain number of the preferred colors selected most frequently can be determined as the preferred skin colors.

For example, ninety-four (94) observers in total including sixty-two (62) men and thirty-two (32) women of early twenties pass through adaptation to the light for five minutes under the illuminant D65 in the darkroom, and then observe one-hundred and eighty (180) printed face images according to the brightness.

Figure 2:
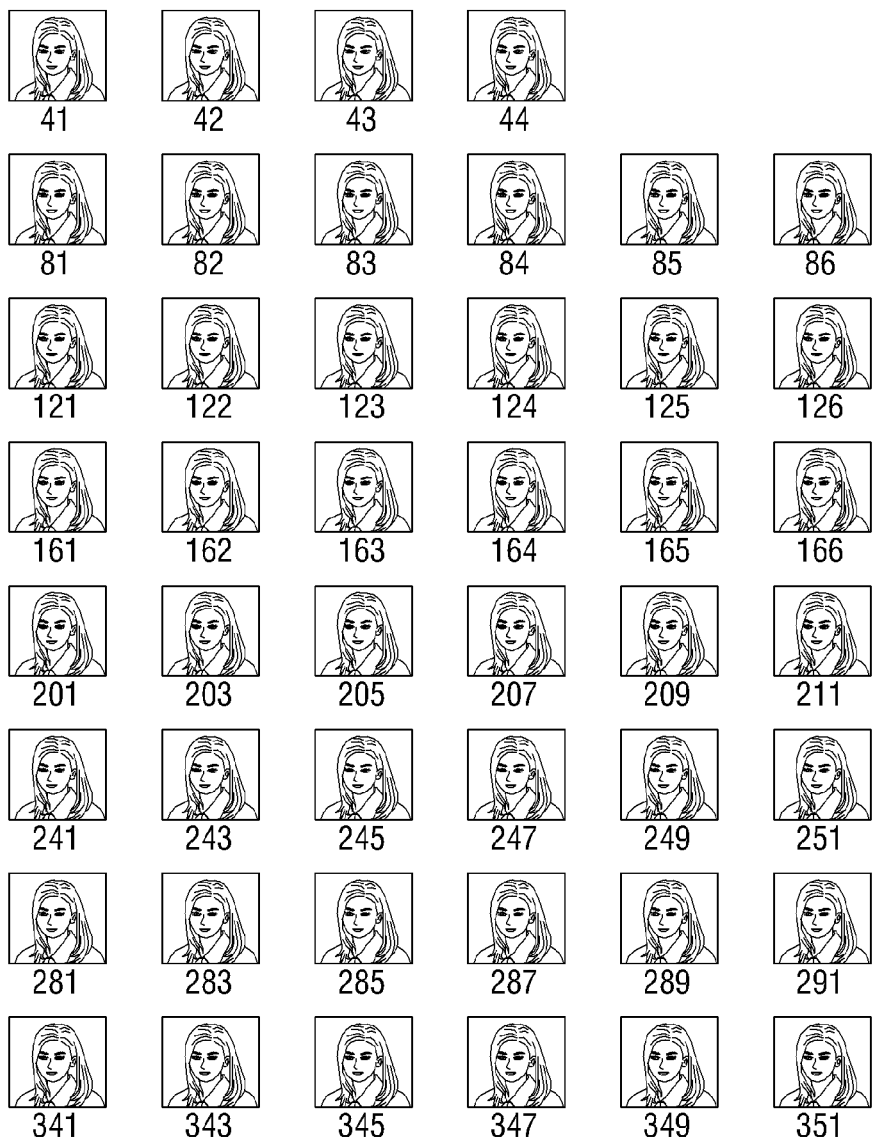
FIG. 2 is a diagram of face images used in an experiment to select a preferred skin color.

FIG. 2 illustrates a plurality of face images (41-351) used in the experiment to select the preferred skin color. As shown in FIG. 2, each face image (41-351) is identical. While the same face images are displayed in FIG. 2 to ease the understanding, the color of the face images varies gradually in the actual experiment. FIG. 2 depicts the face images corresponding to the brightness 0.7.

In this experiment, the observer can first select his/her preferred skin color from the provided face images. The selected face images (41-351) are scored from five points to one point according to their level.

FIG. 3 depicts preference scores obtained through the experiment.

FIG. 3A shows the preferred skin colors corresponding to the Medium-skin toned race, FIG. 3B shows the preferred skin colors corresponding to the Light-skin toned race, and FIG. 3C shows the preferred skin colors corresponding to the Dark-skin toned race. Referring to FIG. 3, the preferred color differs person by person, whereas the assessment on the top four images mostly occupies more than 30% of all of the images. Thus, the preferred color is selectively reproduced among the plurality of the highest preferred colors, rather than reproducing the preferred color with the single color most preferred. The number of the preferred colors can be randomly set. In at least one exemplary embodiment illustrated in FIG. 3, four preferred colors are selected. For example, the face images No. 161, 163, 207, and 221 are most preferred corresponding to the Medium-skin toned race in FIG. 3A, the face images No. 241, 281, 261 and 341 are most preferred corresponding to the Light-skin toned race in FIG. 3B, and the face images No. 41, 61, 80, and 101 are most preferred corresponding to the Dark-skin toned race in FIG. 3C. The skin color of the selected face image is measured using a spectrophotometer, converted into the YCbCr color space, and stored as preferred skin color information to the storage unit 130. That is, four preferred skin color information may be provided corresponding to each race through the experiments. The YCbCr color space includes Y as the luminance component, Cb as the blue-difference chroma component and Cr as the red-difference chroma component.

Meanwhile, another method to obtain the preferred skin color information can check the number of counts of the skin color distributed in on-line magazine images issued in countries of the races. In other words, it is possible to assume that the magazine images reproduce the skin color preferred by people in the corresponding country according to magazine characteristics. Hence, only the skin color region per race is detected from a plurality of the magazine images (e.g., more than 100 images) and then the number of the counts of the chromaticity of the skin color region can be compared. As a result, the preferred skin colors per race under the brightness 0.7 are arranged in Table 1.

TABLE 1

| | Preferred skin colors of Light-skin toned race | | | Preferred skin colors of Dark-skin toned race | | | Preferred skin colors of Medium-skin toned race | | |
|---|---|---|---|---|---|---|---|---|---|
| | Cb | Cr | Counting | Cb | Cr | Counting | Cb | Cr | Counting |
| 1 | 108 | 152 | 61384 | 103 | 150 | 15425 | 103 | 153 | 44020 |
| 2 | 112 | 153 | 40362 | 117 | 142 | 5208 | 112 | 148 | 22946 |
| 3 | 103 | 155 | 25090 | 121 | 137 | 4929 | 95 | 155 | 13758 |
| 4 | 111 | 147 | 8926 | 80 | 165 | 2738 | 90 | 158 | 11069 |

The preferred skin color information obtained through the above-mentioned observer experiments and the preferred skin color information using the magazine images are compared as shown in the following table.

TABLE 2

| | Preferred skin colors of Medium-skin toned race in magazine image | | Preferred skin colors of Medium-skin toned race according to observer | |
|---|---|---|---|---|
| | Cb | Cr | Cb | Cr |
| 1 | 103 | 153 | 103.7213 | 154.2395 |
| 2 | 112 | 148 | 114.9513 | 147.6543 |
| 3 | 95 | 155 | 92.19112 | 159.1286 |
| 4 | 90 | 158 | 92.73448 | 162.1986 |

In Table 2, only the preferred skin colors of the Medium-skin toned race are compared to ease the understanding. As a result, the preferred skin colors obtained in the two methods are substantially similar. As such, the preferred skin color information acquired in various manners can be stored to the storage unit 130.

Figure 4A:
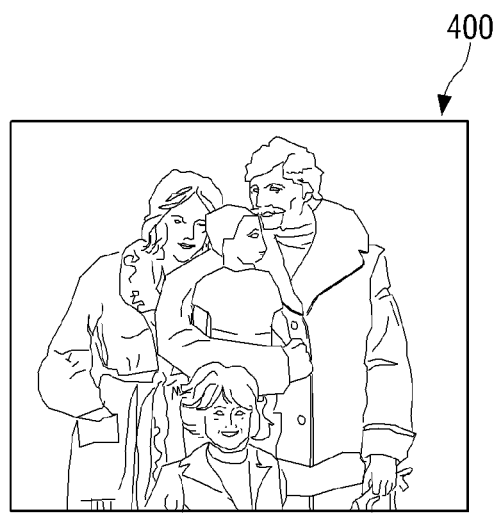
FIGS. 4A and 4B illustrate an input image and a skin region detected from the input image.
Figure 4B:
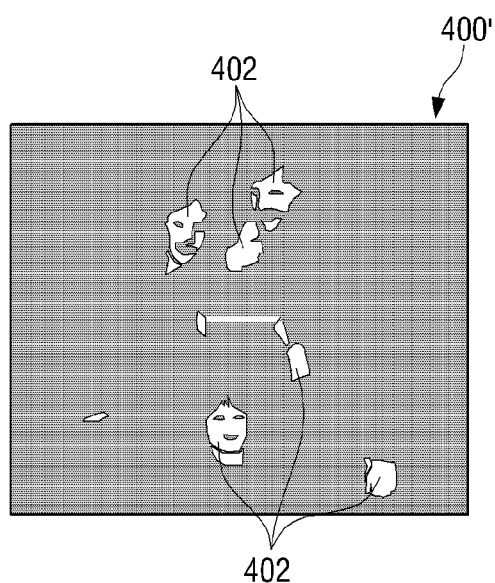

Referring to FIGS. 1-5, the control unit 120 determines the race by recognizing the person image, that is, subjects of an input image 400 (see FIG. 4A), and generates a converted input image 400' to distinguish the skin region 402 of the person in the input image fed from the input unit 110 (see FIG. 4B). Next, the control unit 120 selects the preferred skin color to apply to the skin region 402 based on the plurality of the preferred skin color information stored to the storage unit 130.

The compensation unit 140 can correct the color of the skin region 402 using the preferred skin color selected by the control unit 120.

While the person in the image mostly includes only one race, several races can exist together, as described in greater detail below. Hence, the control unit 120 can select the race per region with respect to the part of the detected skin color, that is, the skin region in the whole image.

Figure 5:
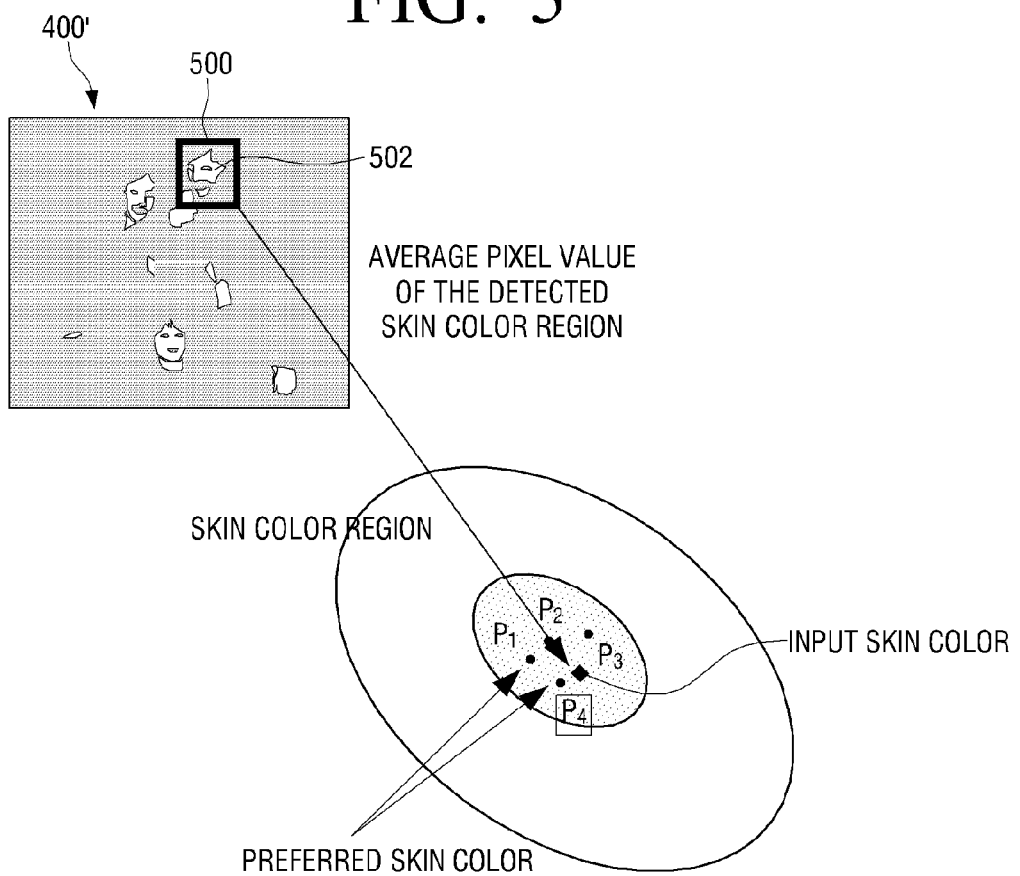
FIG. 5 is a diagram of the preferred skin color selection process corresponding to a dark-skin toned race.

Referring to FIG. 5, the control unit 120 selects the preferred skin colors per race according to the input skin color with respect to a race selected region, and controls the compensation unit 140 to correct the skin color in proportion to the preferred skin color.

More specifically, the control unit 120 divides the input image 400 into a one or more blocks 500, and detects the block corresponding to a selected skin region 502 corresponding to the block 500. Although one block 500 is illustrated in FIG. 5, a plurality of blocks may be assigned to a plurality of skin regions of one or more subjects, i.e., persons, of the input image. Next, the control unit 120 determines the race of the selected skin region 502 corresponding to the block 500 using pixel characteristic information of the detected block and the plurality of the preferred skin color information stored to the storage unit 130.

The pixel characteristic information can be an average chromaticity according to an average brightness per block. That is, the average chromaticity of all of the pixels in the corresponding block, or the chromaticity of the representative pixel can be the pixel characteristic information.

The control unit 120 calculates Euclidean distance between the average chromaticity and the chromaticity of the multiple preferred skin color information, and confirms the preferred skin color information of the minimum Euclidean distance in relation to the average chromaticity among the multiple preferred skin color information. Thus, the race corresponding to the minimum preferred skin color information can be determined as the race of the corresponding skin region.

Herein, the control unit 120 can compare the Euclidean distances between the preferred skin colors preset corresponding to the determined race, and the average chromaticity, and thus select the minimum preferred skin color as a final preferred skin color.

The compensation unit 140 can correct the color of the output image using the final preferred skin color selected. In detail, the compensation unit 140 calculates a nonlinear weight according to the difference between the selected preferred skin color and the skin color of the selected skin region 502. Next, after multiplying the difference between the preferred skin color and the skin color of the skin region by the calculated weight, the compensation unit 140 calculates the corrected output color by adding the product to the skin color of the selected skin region 502 and thus outputs the input image in the calculated output color.

The determination and the calculation process of the control unit 120 are now explained in further detail.

To take account of a picture including several races, the control unit 120 selects the race corresponding to each skin color region detected in the image. At this time, using a labeling algorithm, the control unit 120 divides the detected skin color region into the blocks and calculates the average brightness and the average chromaticity of each block. Next, the control unit 120 calculates the Euclidean distance between the average chromaticity and the average value of the skin color of each race per block. Thus, the control unit 120 selects the race of the minimum Euclidean distance calculated.

The Euclidean distance $d_r$ is calculated based on the following equation.

$$d_{race} = w_{race} * [(Cb_{avr\text{-}block\text{-}n} - Cb_{avr\text{-}race})^2 + (Cr_{avr\text{-}block\text{-}n} - Cr_{avr\text{-}race})^2]^{1/2}$$ [Equation 1]

$w_{race} = 1 - P(race)$
$d_r = \min[d_{race}]$
r = selected race

In Equation 1, race includes the Dark-skin toned race, the Light-skin toned race, and the Medium-skin toned race, and $Cb_{avr\text{-}block\text{-}n}$ and $Cr_{avr\text{-}block\text{-}n}$ denote the average chromaticity value calculated per block of the detected skin color region. $Cb_{avr\text{-}race}$ and $Cr_{avr\text{-}race}$ denote the average value of the skin color of each race per block of the detected skin color region.

P(race) denotes the selected preferred skin color of each race. The subscript n denotes the total number of the blocks of the detected skin color region. The term $w_{race}$ denotes the weight using the distribution of the race-based skin colors according to the brightness.

As described above, FIG. 4 depicts the skin region detected from the input image 400. FIG. 4A shows the original input image 400, and FIG. 4B illustrates a converted input image 400', which shows only the skin regions 402 exposing the skin, including but not limited to, a face or a hand. This skin region detection can be fulfilled in various exemplary embodiments of the present general inventive concept.

As mentioned above, the entire input image 400 may be divided into a plurality of blocks 500, each formed of n×m pixels, and then the average pixel value in each block is detected. Hence, the consecutive blocks 500 with the average pixel value within a certain range are recognized as the block 500 corresponding to the same object. Hence, the set of the blocks 500 having the pixel value corresponding to the skin color can be recognized as a selected skin region 502. Herein, the skin color varies according to the race and the brightness. Table 3 shows the brightness-based distribution of the skin colors per race.

determination, the optimal preferred color can be selected from eight preferred colors in total by considering all of the four preferred colors corresponding to each of the Medium-skin toned race and the Light-skin toned race.

Based on the preferred skin color experiments described above, the skin color preferred by the people exhibits the even preference corresponding to the top four points as in the preferred skin color level, rather than reproducing in one skin color. Thus, when a race of the skin color region is selected corresponding to the input skin color, the optimal preferred skin color can be selected by selectively applying the top four preferred skin colors corresponding to the selected race.

In case of the Dark-skin toned race, the optimal preferred skin color may be determined from the four preferred skin colors preset corresponding to the Dark-skin toned race as described above.

FIG. 5 is a diagram of the optimal preferred skin color selection corresponding to the Dark-skin toned race. Referring to FIG. 5, when the detected skin color region 502 corresponds to the Dark-skin toned race, the Euclidean distances

TABLE 3

| Medium-skin toned race | | | Light-skin toned race | | | Dark-skin toned race | | |
| --- | --- | --- | --- | --- | --- | --- | --- | --- |
| brightness | pixels | distribution | brightness | pixels | distribution | brightness | pixels | distribution |
| 0 | 151 | 0% | 0 | 2 | 0% | 0 | 71304 | 2% |
| 0.1 | 5223 | 0% | 0.1 | 131 | 0% | 0.1 | 449598 | 15% |
| 0.2 | 69243 | 2% | 0.2 | 7868 | 0% | 0.2 | 661414 | 22% |
| 0.3 | 266287 | 7% | 0.3 | 113503 | 3% | 0.3 | 577579 | 19% |
| 0.4 | 507126 | 14% | 0.4 | 335451 | 9% | 0.4 | 483881 | 16% |
| 0.5 | 689717 | 19% | 0.5 | 572819 | 16% | 0.5 | 332433 | 11% |
| 0.6 | 734355 | 20% | 0.6 | 687160 | 19% | 0.6 | 196735 | 6% |
| 0.7 | 652555 | 18% | 0.7 | 722907 | 20% | 0.7 | 108303 | 4% |
| 0.8 | 381624 | 11% | 0.8 | 613556 | 17% | 0.8 | 69609 | 2% |
| 0.9 | 201873 | 6% | 0.9 | 388748 | 11% | 0.9 | 48243 | 2% |
| 1 | 83586 | 2% | 1 | 147399 | 4% | 1 | 52608 | 2% |

To verify the performance of the race selection using the average chromaticity per block of the detected skin color and the skin color distribution of the race per brightness, the detection rate and the false rate calculated corresponding to the entire blocks using 50 image per race are shown in Table 4.

between the four preferred skin colors P1 through P4 pre-stored corresponding to the Dark-skin toned race and the input skin color are compared. In more detail, the Euclidean distance between each preferred skin color and the average chromaticity of the input image can be calculated based on Equation 2.

TABLE 4

| Medium-skin toned race | | | | Light-skin toned race | | | | Dark-skin toned race | | | |
| --- | --- | --- | --- | --- | --- | --- | --- | --- | --- | --- | --- |
| Total blocks | TRUE | FALSE | Success rate | Total blocks | TRUE | FALSE | Success rate | Total blocks | TRUE | FALSE | Success rate |
| 71 | 44 | 27 | 62% | 76 | 59 | 17% | 78% | 73 | 42 | 3av1 | 57% |

As a result, while the race selection success rate corresponding to the Dark-skin toned race is as high as (or similar to) the Medium-skin toned race and the Light-skin toned race, the Medium-skin toned race and the Light-skin toned race which have the similar average chromaticity and brightness-based distribution are mixed in the detection. Hence, the region selected as the Dark-skin toned race selectively reproduces the skin color corresponding to the four preferred colors per brightness of the Dark-skin toned race, and the region selected as the Medium-skin toned race and the Light-skin toned race selectively reproduces the preferred skin colors by considering the preferred colors of the both races. That is, when it is not the Dark-skin toned race according to the race

[Equation 2]

$$d_x = w_x * \sqrt{(Cb_{Px} - Cb_{input\text{-}block\text{-}avr})^2 + (Cr_{Px} - Cr_{input\text{-}block\text{-}avr})^2}$$

$$w_x = 1 + \left(1 - \frac{P_x \text{count}}{\max \text{count}}\right), x = 1, 2, 3, 4$$

$$d_s = \min(d_x)$$

$$P_s = \text{preferred skin color}$$

In Equation 2, $w_x$ denotes the weight corresponding to the preferred skin color $P_xdp$. That is, the rate of the score of the preferred skin color $P_x$ obtained through the preference experiment is used as the weight for $P_x$. $Cb_{input-block-avr}$ and $Cr_{input-block-avr}$ denote the average chromaticity of the region of the input pixel, and $Cb_{P_x}$ and $Cr_{P_x}$ denote the chromaticity of the preferred skin colors. $d_x$ denotes the Euclidean distance between each preferred skin color and the average chromaticity, and $d_s$ denotes the minimum Euclidean distance among the Euclidean distances between the average chromaticity value of the detected skin color region and the four preferred skin colors. The term $P_s$ denotes the preferred skin color selected corresponding to the region of the input pixel having the minimum Euclidean distance.

Figure 6:
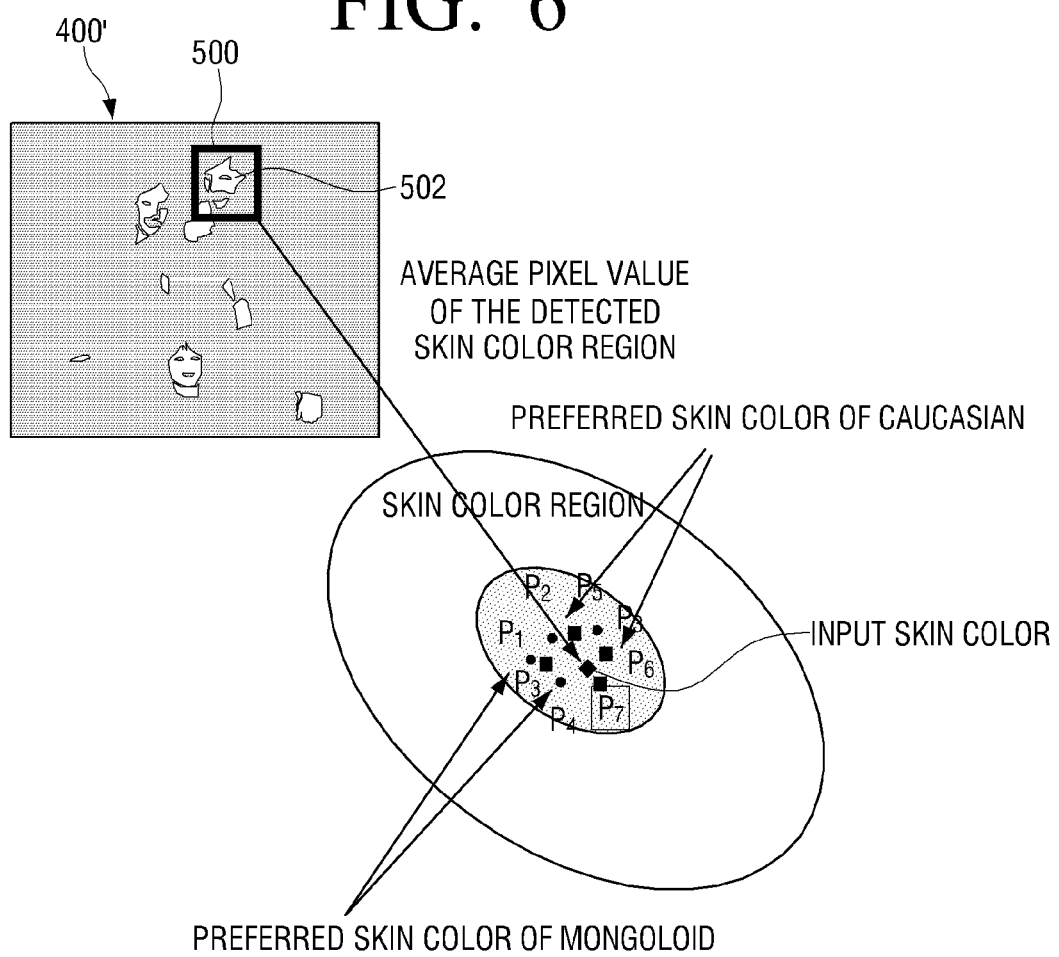
FIG. 6 is a diagram of the preferred skin color selection corresponding to a medium-skin toned race and a light-skin toned race.

FIG. 6 is a diagram of the optimal preferred skin color selection corresponding to the non-Dark-skin toned race. Referring to FIG. 6, when the detected skin color region is not the Dark-skin toned race, the Euclidean distances between the four preferred skin colors P1 through P4 pre-stored corresponding to the Medium-skin toned race and the four preferred skin colors P5 through P8 pre-stored corresponding to the Light-skin toned race, and the input skin color are compared. In more detail, the Euclidean distance between each preferred skin color and the average chromaticity of the input image can be calculated based on Equation 3. Equation 3 applied to the non-Dark-skin toned race is substantially the same as Equation 2, except that the number of the preferred skin colors is eight in Equation 3.

$$d_x = w_x * \sqrt{(Cb_{P_x} - Cb_{input-block-avr})^2 + (Cr_{P_x} - Cr_{input-block-avr})^2}$$

$$w_x = 1 + \left(1 - \frac{P_x \text{count}}{\max \text{count}}\right), x = 1, 2, 3, 4, ..., 8$$

$$d_s = \min(d_x)$$

$$P_s = \text{preferred skin color}$$

[Equation 3]

The control unit 120 can finally select the preferred skin color to apply to the skin region as explained above. Hence, the control unit 120 controls the compensation unit 140 to correct the image using the selected preferred skin color.

To compensate the degraded skin color with the preferred skin color per region, the compensation unit 140 can take account of the difference between the input skin color and the preferred skin color. That is, the compensation unit 140 can reproduce the soft skin color by regulating the correction rate in proportion to the difference. More specifically, for the small difference between the input skin color and the preferred skin color, the color is corrected with the preferred color at the low rate. For the great difference between the input skin color and the preferred skin color, the color is corrected with the preferred color at the high rate.

Figure 7:
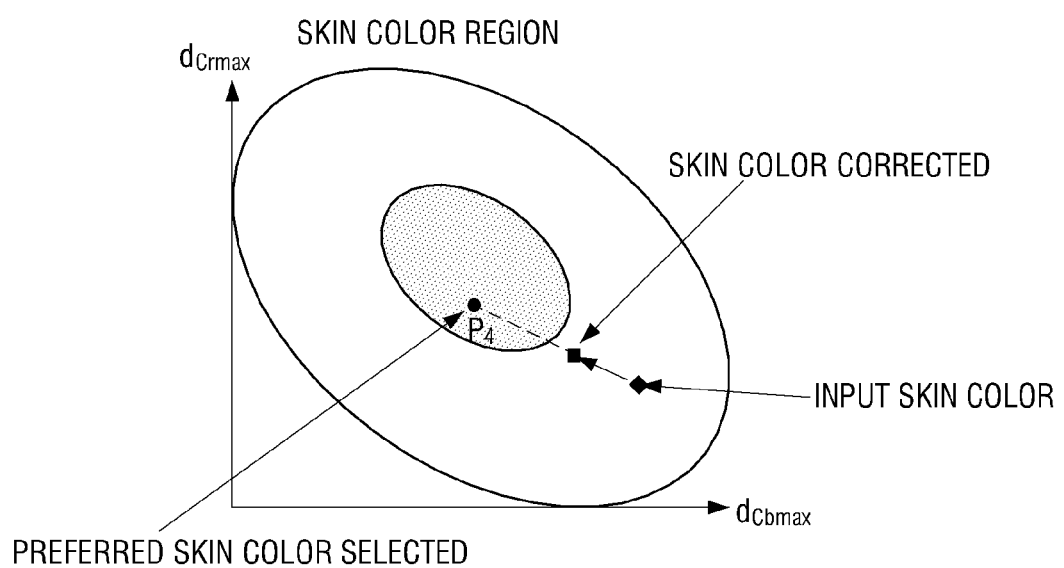
FIG. 7 is a diagram of skin color correction using the selected preferred skin color.

FIG. 7 illustrates a correction of a difference between the input skin color and the preferred skin color. Referring to FIG. 7, when the optimal preferred skin color (e.g., P4) is determined among the plurality of the preferred skin colors, the color elements Cb and Cr of the input skin color are adjusted toward the selected preferred skin color. The adjust degree is determined in proportion to the difference between the input skin color and the preferred skin color as mentioned above.

In detail, the compensation unit 140 calculates the output color using the following equation, outputs the calculated output color, and thus performs the correction.

$$Cb_{output} = Cb_{input} + R1(Cb_{preferred} - Cb_{input})$$

$$Cr_{output} = Cr_{input} + R2(Cr_{preferred} - Cr_{input})$$

$$R1 = |(Cb_{preferred} - Cb_{input})/d_{Cb\ max}|^2$$

$$R2 = |(Cr_{preferred} - Cr_{input})/d_{Cr\ max}|^2$$

[Equation 4]

In Equation 4, $Cb_{output}$ and $Cr_{output}$ denote the output color corrected for Cb and Cr, $Cb_{preferred}$ and $Cr_{preferred}$ denote the preferred skin color selected for Cb and Cr, R1 and R2 denote the weight for Cb and Cr, $d_{Cb\ max}$ and $d_{Cr\ max}$ denote maximum difference and minimum difference of Cb and Cr respectively, and $Cb_{input}$ and $Cr_{input}$ denote the values Cb and Cr of the skin region respectively.

As above, the optimal preferred skin color is determined using the plurality of the preferred skin colors and then the color is converted using the preferred skin color, thus enhancing the user's satisfaction. Generally, since the preferred color reproduction algorithm cannot obtain the color information of the actual scene which is the criteria, the subjective assessment according to the human's view is evitable. To assess the preferred color reproduction method of the present general inventive concept, a subjective assessment method Z-score is adopted. 45 observers (35 men and 10 women) in the early twenties participated in the experiment, to select the better image by comparing the printed input image, the conventional conversion method, and the printed image of the present method.

As a result, with respect to the image including several races together, more people prefer the image converted by the present method over the image converted by the conventional method.

As such, the race selective color conversion method or color reproduction method corresponding to the detected skin color region is processed on the pixel basis of the image and easily applicable to various image devices, that is, to various hardware devices such as digital cameras, scanners, printers, multi-function mobile phones, and displays. In addition, it may be applied immediately to a digital image stored via color reproduction software, and applied to not only the face but also every skin color detected in the image, thus magnifying the visual effect.

Figure 8:
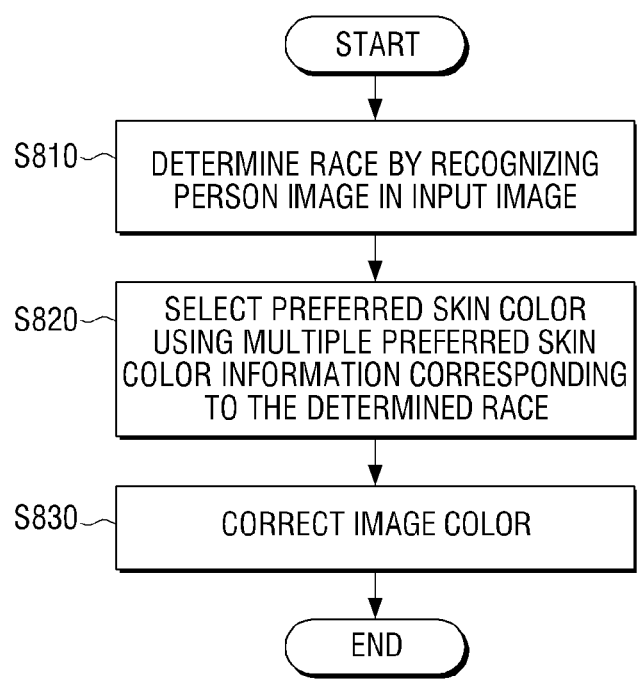
FIG. 8 is a flowchart of a color conversion method according to an exemplary embodiment of the present general inventive concept.

FIG. 8 is a flowchart of a color conversion method according to an exemplary embodiment of the present general inventive concept.

Referring to FIG. 8, the color conversion method determines the race by recognizing the person image, i.e., subject, in the input image. Accordingly, a skin region, such as a hand, face, etc., of the person (S810) may be detected. Next, the method selects the preferred skin color using the plurality of the preferred skin color information corresponding to the determined race (S820). The method corrects the color of the skin region of the person included in the image using the selected preferred skin color (S830).

Figure 9:
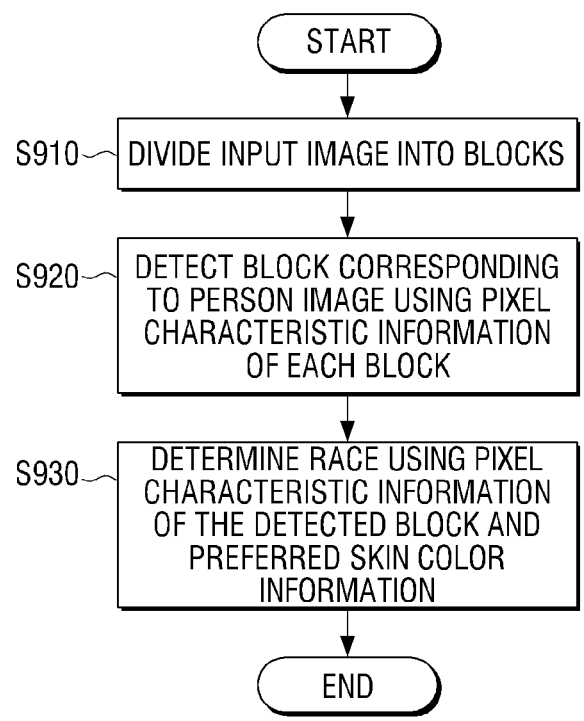
FIG. 9 is a flowchart of a method to determine the race of a person in the input image.

FIG. 9 is a flowchart of a method to determine the race. Referring to FIG. 9, the method divides the input image into a plurality of blocks (S910) and detects the block corresponding to a subject of the image, e.g., person, using the pixel characteristic information of each divided block (S920). Hence, the method can determine the race of the corresponding person image using the pixel characteristic information of the detected block and the preferred skin color information (S930).

Figure 10:
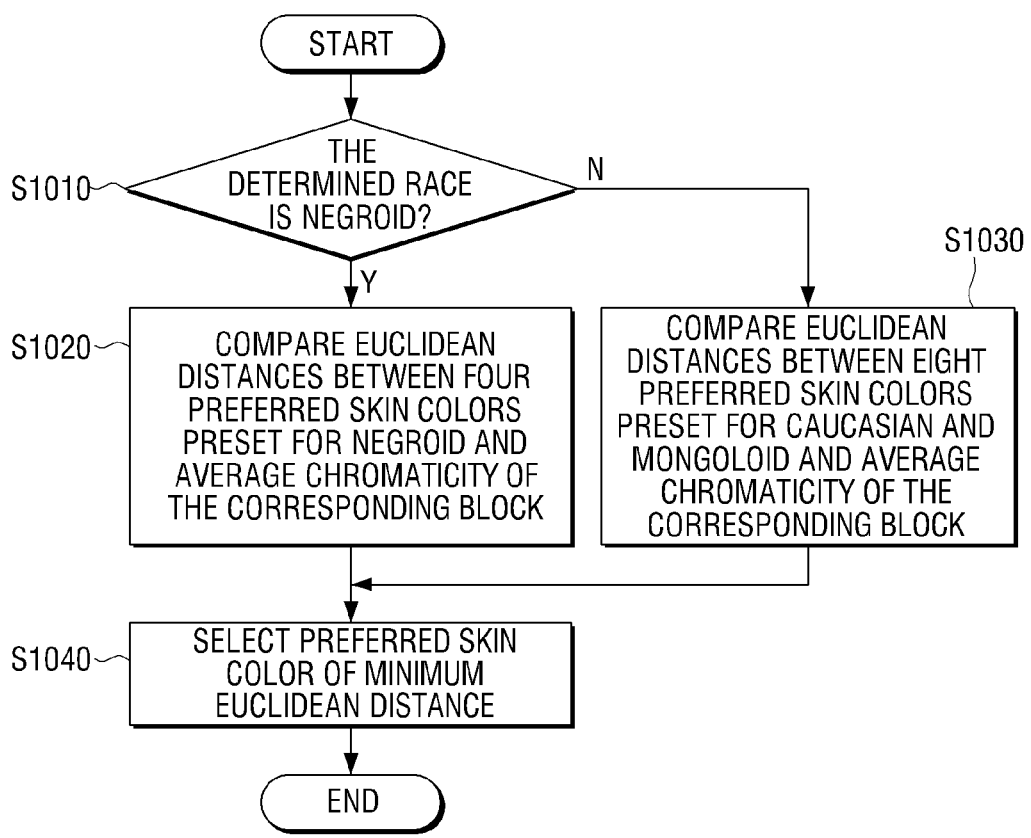
FIG. 10 is a flowchart of a method to select the preferred skin color per race.

FIG. 10 is a flowchart of a method to select the optimal preferred skin color according to the determined race. Referring to FIG. 10, when the determined race is the Dark-skin toned race (S1010), the method compares the Euclidean distances between the four preferred skin colors preset corresponding to the Dark-skin toned race and the average chromaticity of the corresponding block (S1020). By contrast, when the determined race is not the Dark-skin toned race (S1010), the method compares the Euclidean distances between the eight preferred skin colors preset corresponding to the Medium-skin toned race and the Light-skin toned race and the average chromaticity of the corresponding block (S1030). Based on the comparison results, the method selects the preferred skin color of the minimum Euclidean distance (S1040).

As such, when the preferred skin color is selected, the color of the skin region may be corrected using the preferred skin color. Thus, the person image of each race may be represented in the skin color most familiar to the user. Note that the present color conversion method can fulfill the color conversion using the same equations and data as the above-mentioned color conversion apparatus 100.

Meanwhile, in another exemplary embodiment of the present general inventive concept, the determining of the race may be omitted. That is, when the skin region is detected from the input image, the preferred skin color corresponding to the detected skin region may be selected from the plurality of the preset preferred skin color information. Accordingly, the color of the skin region can be corrected using the selected preferred skin color. Herein, the plurality of the preferred skin color information includes the plurality of the preferred skin color information obtained per race through repetitive experiments.

This method can be carried out by the color conversion apparatus 100 of FIG. 1 as well. That is, the storage unit 130 can pre-store the plurality of the preferred skin color information. For example, the storage unit 130 can store four preferred skin color information corresponding to each of the Dark-skin toned race, the Medium-skin toned race, and the Light-skin toned race. When an image is input via the input unit 110, the control unit 120 detects the skin region from the input image and selects the preferred skin color information corresponding to the detected skin region among the preferred skin color information stored to the storage unit 130. The compensation unit 140 corrects the color according to the preferred skin color selected by the control unit 120.

In another exemplary embodiment of the present general inventive concept, an input image may include multiple subjects of different races. Hence, a control unit may select the race per region with respect to the part of the detected skin color, that is, the skin region in the whole image.

Figure 11A:
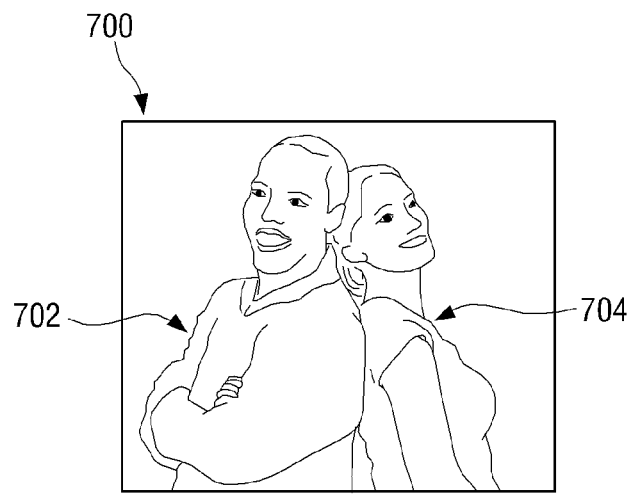
FIGS. 11A and 11B illustrate an alternative input image and skin regions of the input image.
Figure 11B:
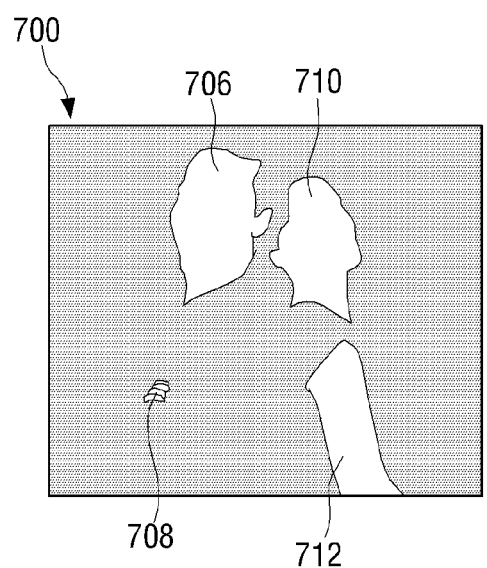

Referring to FIGS. 11A and 11B, a control unit 120 may receive an input image 700 including a first subject 702 having a dark skin tone of a first race, and a second subject 704 having a light, i.e., fair, skin color of a second race. Each of the first and second subjects 702, 704 may further include a plurality of skin regions. That is, the first subject 702 may include a first dark skin region 706 and a second dark skin region 708, and the second subject 704 may include a first light skin region 710 and a second light skin region 712. The plurality of skin regions may include, but is not limited to, a head, an arm, a hand, a leg, a foot, and a torso. The control unit 120 may convert the input image 700, as shown in FIG. 11B, to determine the plurality of skin regions 706-712 of the first and second subjects 702,704, respectively.

More specifically, a color conversion apparatus 100, as described in detail above, may receive the input image 700, and adjust a color of one or more skin regions 706-712 of the first and second subjects 702,704. The color conversion apparatus 100 includes a control unit 120 that determines the first and second subjects 702, 704. Additionally, the control unit 120 may determine the plurality of skin regions 706-712 of the first and second subjects 702,704, and the skin color of the dark skin regions 706, 708 and/or the light skin regions 710, 712. A plurality of blocks may be generated to identify selected skin regions among the skin regions 706-712, as described in detail above. Further, the control unit 120 generates plurality of selectable preferred colors to adjust the skin color of one or more of the skin regions 706-712, as discussed above. For example, the control unit 120 may generate four preferred colors to adjust the skin regions 706,708 in response to detecting the dark skin of the first subject 702, and may generate eight preferred colors to adjust the skin regions 710,712 in response to detecting the light skin of the second subject 704.

The color conversion apparatus 100 further includes a compensation unit 140 that adjusts the color of one or more skin regions 706-712, as discussed above. That is, the plurality of preferred colors generated by the control unit 120 are separated, i.e., distinguishable, from one another according to a Euclidean distance. The compensation unit 140 determines the Euclidean distance of each preferred color generated by the control unit 120, and selects the preferred color having a minimum Euclidean distance as a compensation color. Accordingly, the compensation unit 140 may adjust one or more skin regions 706-712 of the first and/or second subjects 702, 704 based on the selected compensation color.

In the meantime, the color conversion method according to another exemplary embodiment may be applied to an image forming apparatus such as printer. A video processor and/or a main controller applied to the image forming apparatus can correct the skin color in a scanned image, in an image transferred from a host device, or in an image read from an internal/external storage medium, using the aforementioned color conversion method and record the corrected image on a paper or other recording medium.

A color control module, including the control unit and the compensation unit discussed in detail above, may be included in a variety of apparatuses including, but not limited to, a still-image photographic camera, an image scanning device. The color control module may also be included in a video reproduction and/or display device, such as a television. The color control module incorporated in a television, for example, may dynamically determine a plurality of skin regions of a moving image, determine the race of the moving image, and automatically correct and/or adjust a color of the skin regions based on the determined race, as discusses further below.

Further, the color control module of the television may determine a background scene including one or more skin portions of the moving image, and may correct and/or adjust a color of the one or more skin regions based on the determined race and the background scene. Accordingly, one or more moving images may be better distinguished from the background scene. Moreover, as the background scene including one or moving image changes, skin regions of moving images may be dynamically adjusted and displayed ideally to a viewer.

The color control module of the television may also generate one or more preset color modes and/or menus, which may be provided to a user via a display of the television. Accordingly, the user may control the color control module to adjust the detected skin portions based on the preset color modes and/or menus.

In at least one exemplary embodiment, the color conversion method described in detail above may be stored to various recording media and implemented by program codes executable by a CPU of an electronic device.

More specifically, the present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, DVDs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few exemplary embodiments of the present general inventive concept have been shown and described, it will be appreciated by those skilled in the art that changes may be made in these exemplary embodiments without departing from the principles and spirit of the general inventive concept, the scope of which is defined in the appended claims and their equivalents.

What is claimed is:

1. A color conversion method comprising:
    determining a race by recognizing a skin region in an input image;
    selecting a preferred skin color to apply to the skin region, based on a plurality of preferred skin color information preset per race; and
    correcting a color of the skin region by adding a correction factor to the color of the skin region, the correction factor being based on the difference between the selected preferred skin color and the color of the skin region.

2. The color conversion method of claim 1, wherein the determining of the race comprises:
    dividing the input image into a plurality of blocks and detecting a block corresponding to the skin region among the plurality of blocks; and
    determining the race of the skin region in the block using pixel characteristic information of the detected block and the plurality of the preferred skin color information.

3. A non-transitory computer-readable medium to contain computer-readable codes as a program to execute the method of claim 1.

4. A color conversion method comprising:
    determining a race by recognizing a skin region in an input image;
    selecting a preferred skin color to apply to the skin region, based on a plurality of preferred skin color information preset per race; and
    correcting a color of the skin region,
    wherein the determining of the race comprises:
        dividing the input image into a plurality of blocks and detecting a block corresponding to the skin region among the plurality of blocks; and
        determining the race of the skin region in the block using pixel characteristic information of the detected block and the plurality of the preferred skin color information
    wherein the pixel characteristic information is an average chromaticity based on an average brightness per block, and
    the determining of the race comprises:
        calculating Euclidean distances between the average chromaticity and a chromaticity of the plurality of the preferred skin color information; and
        confirming the preferred skin color information of a minimum Euclidean distance to the average chromaticity among the plurality of the preferred skin color information, and determining that the skin region is the race corresponding to the confirmed preferred skin color information.

5. The color conversion method of claim 4, wherein the selecting of the preferred skin color, when the determined race is dark-skin toned race, selects the preferred skin color of the minimum Euclidean distance by comparing Euclidean distances between four preferred skin colors preset corresponding to the dark-skin toned race and the average chromaticity, and when the determined race is not the dark-skin toned race, selects the preferred skin color of the minimum Euclidean distance by comparing Euclidean distances between four preferred skin colors preset corresponding to medium-skin toned race and four preferred skin colors preset corresponding to light-skin toned race, and the average chromaticity.

6. A color conversion method comprising:
    determining a race by recognizing a skin region in an input image;
    selecting a preferred skin color to apply to the skin region, based on a plurality of preferred skin color information preset per race; and
    correcting a color of the skin region,
    wherein the correcting comprises:
        calculating a nonlinear weight according to a difference between the selected preferred skin color and the skin color of the skin region;
        multiplying the difference between the preferred skin color and the skin color of the skin region by the weight and calculating an output color corrected by adding the product to the skin color of the skin region; and
        outputting in the calculated output color.

7. The color conversion method of claim 6, wherein the calculating of the output color calculates the output colors for Cb and Cr based on the following equation:

$$Cb_{output} = Cb_{input} + R1(Cb_{preferred} - Cb_{input})$$

$$Cr_{output} = Cr_{input} + R2(Cr_{preferred} - Cr_{input})$$

$$R1 = |(Cb_{preferred} - Cb_{input})/d_{Cb\ max}|^2$$

$$R2 = |(Cr_{preferred} - Cr_{input})/d_{Cr\ max}|^2$$

where $Cb_{output}$ and $Cr_{output}$ denote the output color corrected for Cb and Cr, $Cb_{preferred}$ and $Cr_{preferred}$ denote the preferred skin color selected for Cb and Cr, R1 and R2 denote the weight for Cb and Cr, $d_{Cb\ max}$ and $d_{Cr\ max}$ denote maximum difference and minimum difference of Cb and Cr of the skin region respectively, and $Cb_{input}$ and $Cr_{input}$ denote values Cb and Cr of the skin region respectively.

8. A computer-implemented color conversion apparatus having functional units therein to perform color conversion, comprising:
- a storage unit to store a plurality of preferred skin color information preset per race;
- an input unit to receive an image;
- a control unit to determine a race by recognizing a skin region in the input image input via the input unit, and to select a preferred skin color to apply to the skin region, based on the plurality of the preferred skin color information stored to the storage unit; and
- a compensation unit to correct a color of the skin region by adding a correction factor to the color of the skin region, the correction factor being based on the difference between the preferred skin color selected by the control unit and the color of the skin region.

9. The color conversion apparatus of claim 8, wherein the control unit divides the input image into a plurality of blocks, detects a block corresponding to the skin region among the plurality of the blocks, and determines the race of the skin region in the block using pixel characteristic information of the detected block and the plurality of the preferred skin color information.

10. A computer-implemented color conversion apparatus having functional units therein to perform color conversion, comprising:
- a storage unit to store a plurality of preferred skin color information preset per race;
- an input unit to receive an image;
- a control unit to determine a race by recognizing a skin region in the input image input via the input unit, and to select a preferred skin color to apply to the skin region, based on the plurality of the preferred skin color information stored to the storage unit; and
- a compensation unit to correct a color of the skin region,
- wherein the control unit divides the input image into a plurality of blocks, detects a block corresponding to the skin region among the plurality of the blocks, and determines the race of the skin region in the block using pixel characteristic information of the detected block and the plurality of the preferred skin color information,
- wherein the pixel characteristic information is an average chromaticity based on an average brightness per block, and
- the control unit calculates Euclidean distances between the average chromaticity and a chromaticity of the plurality of the preferred skin color information, confirms the preferred skin color information of a minimum Euclidean distance to the average chromaticity among the plurality of the preferred skin color information, and determines that the skin region is the race corresponding to the confirmed preferred skin color information.

11. The color conversion apparatus of claim 10, wherein, when the determined race is dark-skin toned race, the control unit selects the preferred skin color of the minimum Euclidean distance by comparing Euclidean distances between four preferred skin colors preset corresponding to the dark-skin toned race and the average chromaticity, and when the determined race is not the dark-skin toned race, the control unit selects the preferred skin color of the minimum Euclidean distance by comparing Euclidean distances between four preferred skin colors preset corresponding to medium-skin toned race and four preferred skin colors preset corresponding to light-skin toned race, and the average chromaticity.

12. A computer-implemented color conversion apparatus having functional units therein to perform color conversion, comprising:
- a storage unit to store a plurality of preferred skin color information preset per race;
- an input unit to receive an image;
- a control unit to determine a race by recognizing a skin region in the input image input via the input unit, and to select a preferred skin color to apply to the skin region, based on the plurality of the preferred skin color information stored to the storage unit; and
- a compensation unit to correct a color of the skin region,
- wherein the compensation unit calculates a nonlinear weight according to a difference between the selected preferred skin color and the skin color of the skin region, multiplies the difference between the preferred skin color and the skin color of the skin region by the weight, calculates an output color corrected by adding the product to the skin color of the skin region, and outputs the input image in the calculated output color.

13. The color conversion apparatus of claim 12, wherein the compensation unit calculates the output colors for Cb and Cr based on the following equation:

$$Cb_{output} = Cb_{input} + R1(Cb_{preferred} - Cb_{input})$$

$$Cr_{output} = Cr_{input} + R2(Cr_{preferred} - Cr_{input})$$

$$R1 = |(Cb_{preferred} - Cb_{input})/d_{Cb\ max}|^2$$

$$R2 = |(Cr_{preferred} - Cr_{input})/d_{Cr\ max}|^2$$

where $Cb_{output}$ and $Cr_{output}$ denote the output color corrected for Cb and Cr, $Cb_{preferred}$ and $Cr_{preferred}$ denote the preferred skin color selected for Cb and Cr, R1 and R2 denote the weight for Cb and Cr, $d_{Cb\ max}$ and $d_{Cr\ max}$ denote maximum difference and minimum difference of Cb and Cr of the skin region respectively, and $Cb_{input}$ and $Cr_{input}$ denote values Cb and Cr of the skin region respectively.

14. A color conversion method comprising:
- detecting a skin region from an input image;
- selecting a preferred skin color corresponding to the detected skin region, among a plurality of preferred skin color information; and
- correcting a color of the skin region by adding a correction factor to the color of the skin region, the correction factor being based on the difference between the selected preferred skin color and the color of the skin region,
- wherein the plurality of the preferred skin color information comprises a plurality of preferred skin color information obtained per race through repetitive experiments.

15. A computer-implemented color conversion apparatus having functional units therein to perform color conversion, comprising:
- a storage unit to store a plurality of preferred skin color information obtained per race through repetitive experiments;
- an input unit to receive an image;
- a control unit to detect a skin region in an input image input via the input unit, and to select preferred skin color information corresponding to the detected skin region among the preferred skin color information stored to the storage unit; and
- a compensation unit to correct a color of the skin region by adding a correction factor to the color of the skin region, the correction factor being based on the difference between the preferred skin color selected by the control unit and the color of the skin region.

16. A computer-implemented color conversion apparatus having functional units therein to adjust color of an input image, comprising:
- a control unit to determine a plurality of skin regions included in the image, to determine at least one skin color among the plurality of skin regions, and to generate a plurality of selectable colors to adjust the at least one skin color; and
- a compensation unit to select a compensation color among the plurality of selectable colors and to adjust the at least one skin color of the input image based on the compensation color by adding a correction factor to the skin color, the correction factor being based on the difference between the selected compensation color and the skin color.

17. The color conversion apparatus of claim 16, wherein the control unit determines a first subject of the input image having a first skin color, and determines a second subject having a second skin color different from the first skin color.

18. The color conversion apparatus of claim 17, wherein the first skin color is dark skin and the second skin color is light skin, and
   wherein the control unit generates a first plurality of selectable colors in response to detecting the dark skin and generates a second plurality of selectable colors in response to detecting the light skin.

19. The color conversion of apparatus of claim 16, wherein the plurality of selectable colors are separated from one another according to a Euclidean distance, and
   wherein the compensation unit determines the Euclidean distance of each selectable color and selects a compensation color having a minimum Euclidean distance.

20. A computer-implemented color conversion apparatus having functional units therein to adjust color of an input image, comprising:
- a control unit to determine a plurality of skin regions included in the image, to determine at least one skin color among the plurality of skin regions, and to generate a plurality of selectable colors to adjust the at least one skin color; and
- a compensation unit to select a compensation color among the plurality of selectable colors and to adjust the at least one skin color of the input image based on the compensation color,
wherein the control unit determines a first subject of the input image having a first skin color, and determines a second subject having a second skin color different from the first skin color,
wherein the first skin color is dark skin and the second skin color is light skin,
wherein the control unit generates a first plurality of selectable colors in response to detecting the dark skin and generates a second plurality of selectable colors in response to detecting the light skin, and
wherein the first plurality of selectable colors is four preferred colors and the second plurality of colors is eight preferred colors, each of the second plurality of colors being different from each of the first plurality of colors.

21. A method of adjusting color of an input image, comprising:
- determining a plurality of skin regions included in the image;
- determining at least one skin color among the plurality of skin regions;
- generating a plurality of selectable colors to adjust the at least one skin color;
- adjusting the at least one skin color of the input image based on a compensation color among the plurality of selectable colors by adding a correction factor to the skin color, the correction factor being based on the difference between the compensation color and the skin color.

22. A method of adjusting color of an input image, the method comprising:
- determining at least one skin region included in the image;
- determining a race of the skin region based on a color of the skin region;
- selecting a preferred skin color from among a plurality of preferred skin colors preset per race;
- determining a correction factor based on a difference between the selected preferred skin color and the color of the skin region; and
- adding the correction factor to the color of the skin region.

* * * * *

UNITED STATES PATENT AND TRADEMARK OFFICE
CERTIFICATE OF CORRECTION

| | | |
|---|---|---|
| PATENT NO. | : 8,849,025 B2 | Page 1 of 1 |
| APPLICATION NO. | : 13/297703 | |
| DATED | : September 30, 2014 | |
| INVENTOR(S) | : Kyeong-man Kim et al. | |

It is certified that error appears in the above-identified patent and that said Letters Patent is hereby corrected as shown below:

In the Claims

Column 19, line 27, in Claim 19, before "apparatus" delete "of".

Signed and Sealed this
Second Day of June, 2015

Michelle K. Lee
*Director of the United States Patent and Trademark Office*